United States Patent [19]

Jarvis

[11] Patent Number: 5,752,255
[45] Date of Patent: May 12, 1998

[54] DYNAMIC NON-COHERENT CACHE MEMORY RESIZING MECHANISM

[75] Inventor: Neil Alasdair James Jarvis, Reading, United Kingdom

[73] Assignee: Digital Equipment Corporation, Maynard, Mass.

[21] Appl. No.: 794,565

[22] Filed: Feb. 3, 1997

Related U.S. Application Data

[63] Continuation of Ser. No. 130,060, Sep. 30, 1993, abandoned.

[30] Foreign Application Priority Data

Oct. 1, 1992 [GB] United Kingdom ............ 9220702

[51] Int. Cl.⁶ ............................................. G06F 12/00
[52] U.S. Cl. .................................................. 711/3; 711/5
[58] Field of Search ........................... 395/403, 405, 395/419; 711/3, 5, 209

[56] References Cited

U.S. PATENT DOCUMENTS

| | | | |
|---|---|---|---|
| 4,315,312 | 2/1982 | Schmidt | 711/172 |
| 4,422,145 | 12/1983 | Sacco et al. | 711/160 |
| 4,463,424 | 7/1984 | Mattson et al. | 711/136 |
| 4,503,501 | 3/1985 | Coulson et al. | 711/129 |
| 4,780,815 | 10/1988 | Shiota | 711/171 |
| 4,947,319 | 8/1990 | Bozman | 711/128 |
| 5,025,366 | 6/1991 | Baror | 711/128 |
| 5,301,296 | 4/1994 | Mohri et al. | 711/128 |
| 5,367,653 | 11/1994 | Coyle et al. | 711/128 |

FOREIGN PATENT DOCUMENTS 481616   4/1992   European Pat. Off. ........ G06F 12/08

*Primary Examiner*—Jack A. Lane
*Attorney, Agent, or Firm*—A. Sidney Johnston; Christine M. Kuta

[57] ABSTRACT

A dynamic cache resizing mechanism permitting a non-coherent cache memory to be altered in size during the operation thereof. A cache utilization monitoring system determines whether the cache size is optimised for a particular application and environment, and if it is not, modifies a selection process to resize the cache address space. The non-coherent property of the cache is utilized to permit the change of selection process during use, and the choice of selection process may be effected to take into account the proportion of live cache entries which will remain accessible after resizing, and the proportional change in size of the cache during a resizing operation.

8 Claims, 3 Drawing Sheets

DYNAMIC NON-COHERENT CACHE MEMORY RESIZING MECHANISM

This application is a continuation of application Ser. No. 08/130,060, filed Sep. 30, 1993, now abandoned.

FIELD OF THE INVENTION

The present invention relates to non-coherent cache memories, and in particular to a method of operating a dynamically resizable non-coherent cache.

BACKGROUND OF THE INVENTION

In computer systems generally, where a number of independent processors share common memory resource, it has become widespread practice for each of the independent processors to be provided with a cache memory containing a sub-set of the data contained in the shared memory resource. The sub-set of data retained in the cache is desirably the most commonly used information by the respective processor, and is used to reduce the number of requests which must be made to the shared memory resource for data to be transferred therefrom.

Cache memories also have application in a single processor environment where a high-speed processor may be supported by a small, high-speed (and therefore expensive) cache memory area, and a larger, slow (and therefore cheaper) main memory area.

When designing and implementing a non-coherent cache for a new system, it is often particularly difficult to determine the optimal size of cache that will be required. If the cache is small, then it is low cost, and occupies only a small portion of a fast working memory of the processor. However, the number of successful retrievals of data from the cache without requiring access to the shared memory resource or slower main memory will be small (ie. the hit rate is low), and the benefits of provision of a cache will be severely compromised. If the cache is too large, then although the hit rate is high, valuable high-speed memory is reserved for under-used cache entries, instead of generally enhancing system performance.

It is also common for a system to be utilised in a number of environments, where the nature of the particular environment will determine the optimal cache size. Where the system environment is dynamic, it is particularly difficult to determine the optimum cache size for all conditions.

It is therefore an object of the present invention to provide a method allowing dynamic alteration of the size of a cache in real time while the system utilising the cache is in operation.

It is a further object of the present invention to provide a system which is able to adapt its own environment by dynamically altering its cache size during the running of the system.

SUMMARY OF THE INVENTION

In accordance with an embodiment of the present invention, there is provided a method for resizing a non-coherent cache wherein said cache memory space is sub-divided into a number of pages, each page containing a memory space for a predetermined number of entries, said method including the steps of:

a) setting a cache size of a first number of pages;

b) receiving data items each including a key value and storing said data in said cache at addresses on pages determined by a first selection process operating on said key value;

c) monitoring cache usage to determine whether said first number of cache pages should be increased or decreased;

d) in the event that said first number of cache pages should be increased or decreased, receiving further data items and storing said further data items at addresses on pages in the cache according to a second selection process different to said first selection process.

In accordance with a further embodiment of the present invention, there is provided a cache memory system including:

a processor;

a cache memory including a first number of pages;

means for receiving data items each including a key value and storing said data items in said cache at addresses on pages determined by a first selection process operating on said key values;

means for monitoring cache usage to determine whether said first number of cache pages should be increased or decreased;

means for modifying said first selection process to a second selection process in response to said means for monitoring determining that said first number of cache pages should be increased or decreased, such that further received data items are stored at cache addresses on pages according to said second selection process.

BRIEF DESCRIPTION OF THE DRAWINGS

Embodiments of the present invention will now be described in detail by way of example, and with reference to the accompanying drawings in which.

DETAILED DESCRIPTION

Figure 1:
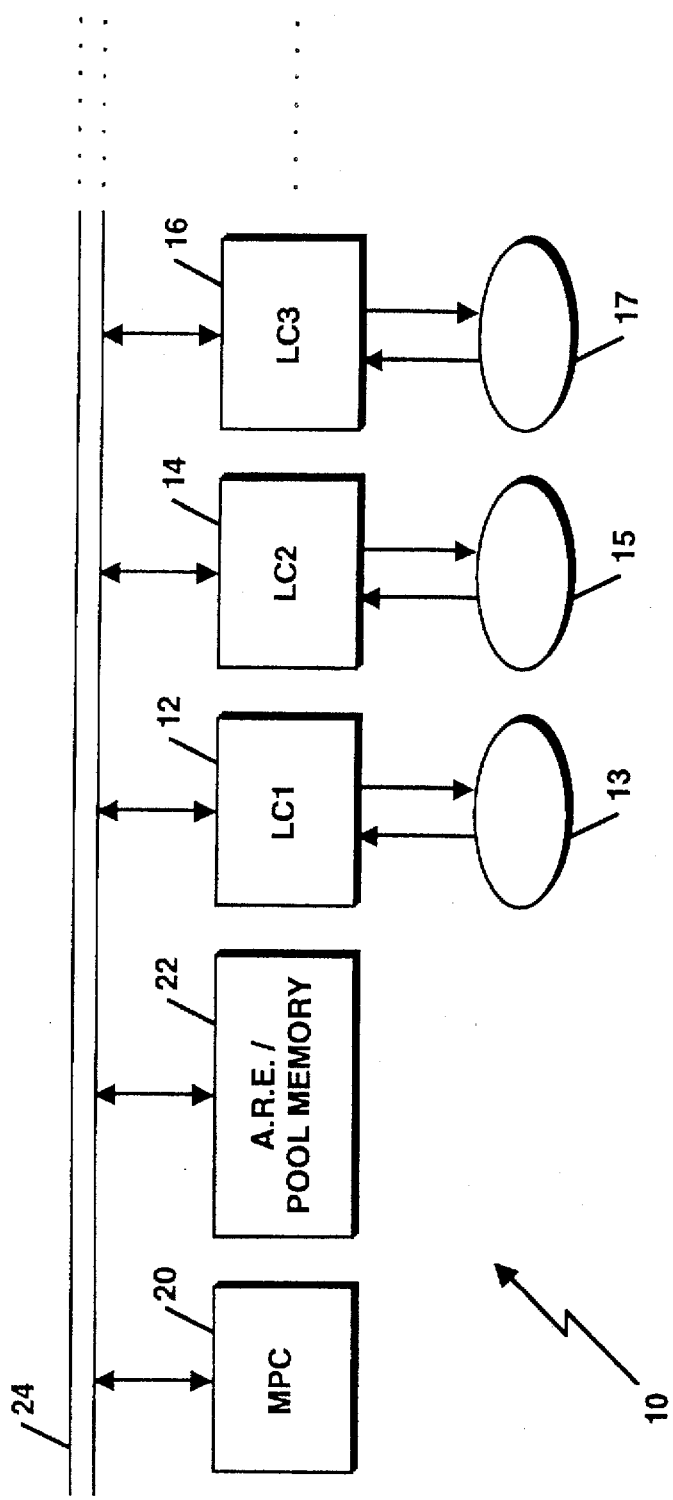
FIG. 1 shows a schematic diagram of a packet routing system illustrative of a possible use of the cache resizing system of the present invention.

With reference to FIG. 1 there is shown a routing system 10 for the routing or bridging of data packets on a data communication network.

The routing system 10 includes a number of linecards (LC1,LC2,LC3) 12,14,16, each of which is connected to a corresponding network 13,15,17 of various types. The linecards 12,14,16 are each responsible for interfacing with the particular type of network to which they are attached. For example, linecard 12 may interface with an FDDI optical fibre network 13, and linecard 14 might interface with an Ethernet type network 15. The linecards 12,14,16 are also coupled to a management processor card (MPC) 20 and a shared memory resource 22 via a high-speed bus 24. The management processor card 20 is responsible for the overall management of the routing system 10. The shared memory resource 22 includes a pool memory used by all linecards in the system and, more specifically includes an address resolution engine (ARE). The address resolution engine 22 includes a database of addresses of nodes within the system 10, including information identifying the particular linecard which provides access to that address. In a typical system, greater than 10000 addresses might be expected.

Figure 2:
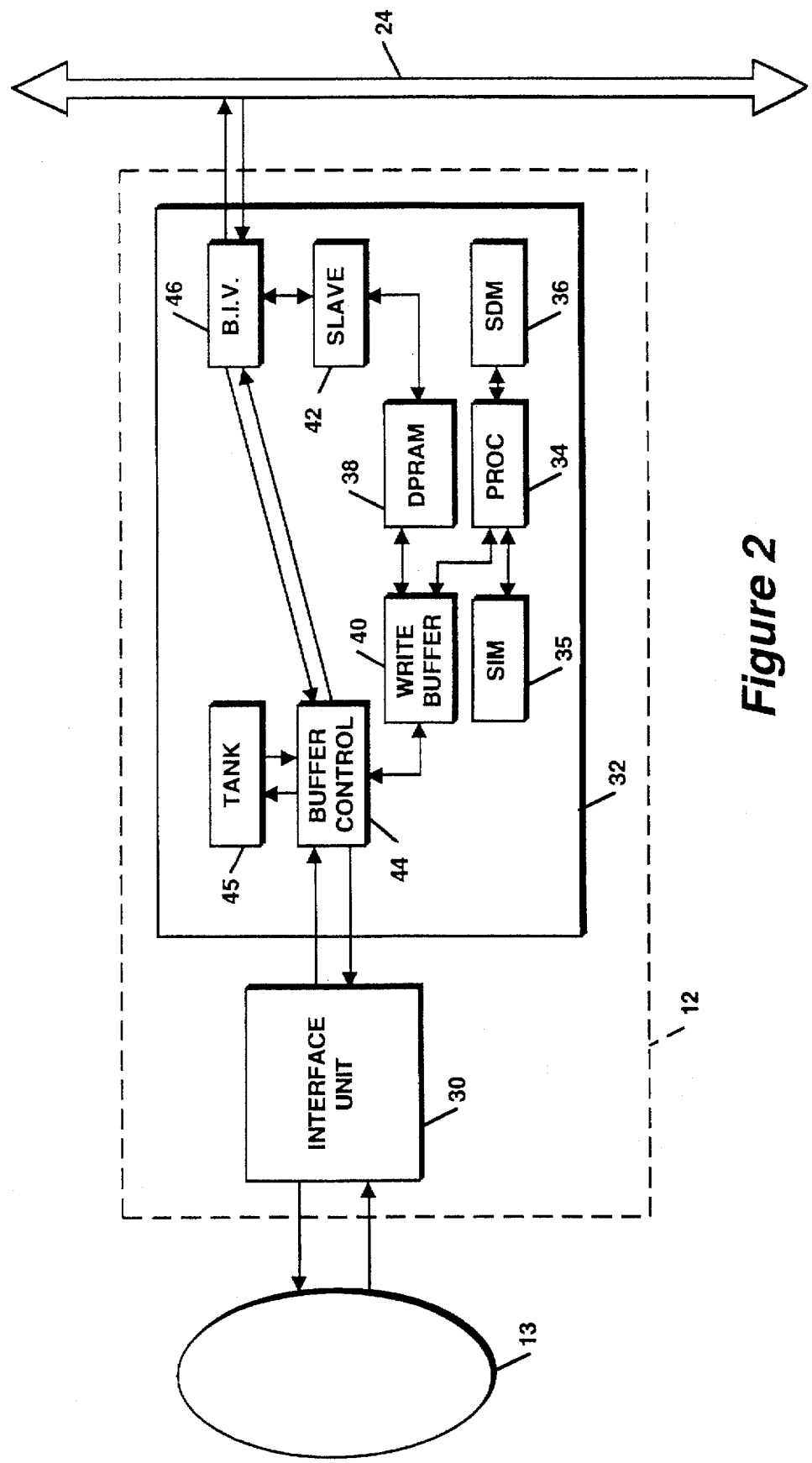
FIG. 2 shows a detailed schematic diagram of a part of the system of FIG. 1.

With reference to FIG. 2, there is shown a detailed schematic diagram of the linecard 12. The line card 12 includes an interface unit 30 for receiving data packets from, and placing data packets onto the optical fibre network 13.

The linecard further includes a packet processing unit 32. Data packets received by interface unit 30 from the network 13 are passed to a buffer controller 44 with an associated tank memory 45 which controls the inflow and outflow of the data packets from and to the interface. Packet processing capability is provided by a high-speed processor 34 with local synchronous instruction memory (SIM) 35 and synchronous data memory (SDM) 36. Processor 34 receives data for processing via a write buffer 40. Processed data packets which are to be routed to other linecards 14,16 in the routing system 10 are placed onto the high-speed bus 24 by a bus interface unit (BIU) 46. The packet processor also includes a slave processor 42 which receives lower priority processing tasks from high-speed processor 34 via a dual port RAM 38.

In order to route or bridge data packets, the packet processing unit 32 must interrogate the address resolution engine 22 with information extracted from the received packet. To do this, a request must be formulated and transmitted to the address resolution engine 22 over bus 24. In response to this interrogation, the address resolution engine 22 responds with the necessary data determining where the packet will be forwarded to, plus additional information relating to destination media access control addresses in the case of a routing packet, and filtering information in the case of a bridge packet.

Since: (a) network traffic tends to be somewhat repetitive in nature, that is, it is common to find trains of packets for the same destination, and (b) the address resolution engine 22 is a shared system resource requiring usage of the system bus 24 with which to provide access by individual linecards 12,14,16, it is desirable to provide each packet processing unit 32 with a cache memory for storing the results of recent address resolution engine interrogations. In the system configuration described, the processor 34 typically stores such a cache in memory 36, working in the high-speed domain of the processor 34. Thus the processor need not await formulation of requests to the address resolution engine 22 by slave processor 42, and transmission and return of data over the bus 24 if the addressing data is in the cache in memory 36. In the present example, the cache in memory 36 may typically include data in respect of 2000 addresses, or 20% of the addresses available in the address resolution engine 22.

The cache 36 includes a cache refreshment mechanism for ensuring that cached data which becomes invalid (or "stale") is removed from the cache. This is achieved by allowing entries in the cache to expire after a certain period of time. A suitable cache refreshment mechanism is described in co-pending UK application to Digital Equipment International Limited, entitled "Low-overhead, non-coherent cache refreshment mechanism" filed on the same day as the present application.

In the present example, the pattern of data packet traffic for which address data must be retrieved is likely to change in real time and, for example, is likely to include peaks and troughs in the number of systems communicating with one another over the networks at any particular time of the day. The number of network addresses regularly used by a particular processor at any one time is also therefore likely to change. This dynamic nature of the networks will effectively alter the optimum cache size for any one processor 34.

Figure 3:
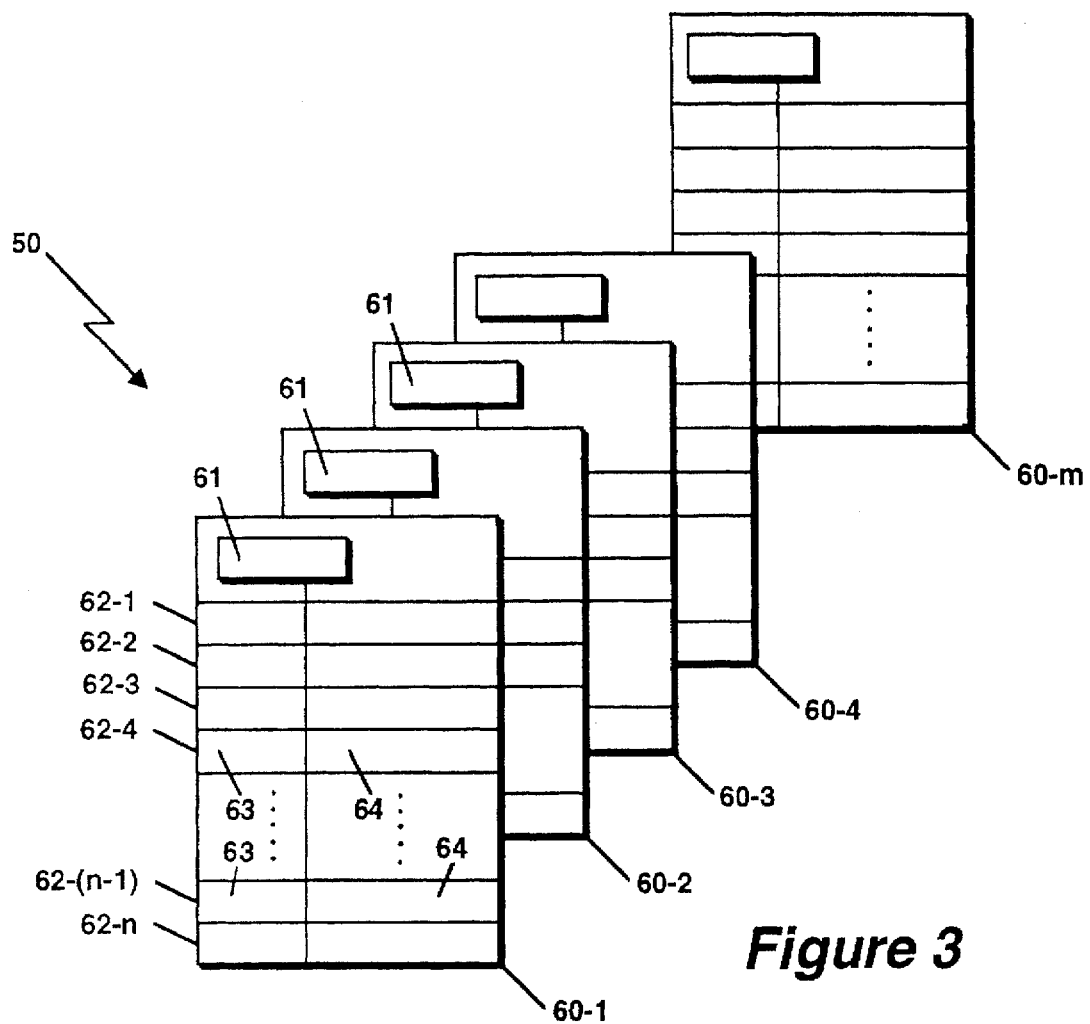
FIG. 3 shows a schematic diagram showing a portion of cache memory according to the present invention.

Referring now to FIG. 3, a cache memory 50 according to the present invention and as stored in synchronous data memory 36 is represented as a series of pages 60-1, 60-2, 60-3 ... 60-m. Each page is identified in memory by its page address 61. Each page includes addressable memory space subdivided into entries 62-1, 62-2, 62-3 ... 62-n. Each entry 62 is identified by its entry address 63. In the example shown in the figure, each page 60 includes $2^7$ addressable locations 62 (n=128), and the cache 50 includes $2^4$ pages 60 (m=16). The relative sizes of pages 60 and cache 50 are exemplary only, and determine the granularity of the cache. A page address 61 may be regarded as a starting position in the cache memory 50, and the entry address 63 regarded as an offset to that position. A page, in the context of this application, is thus defined as any portion of contiguous memory space within the cache memory 36 and may be sufficient for the storage of one or more entries 62.

Figure 4:
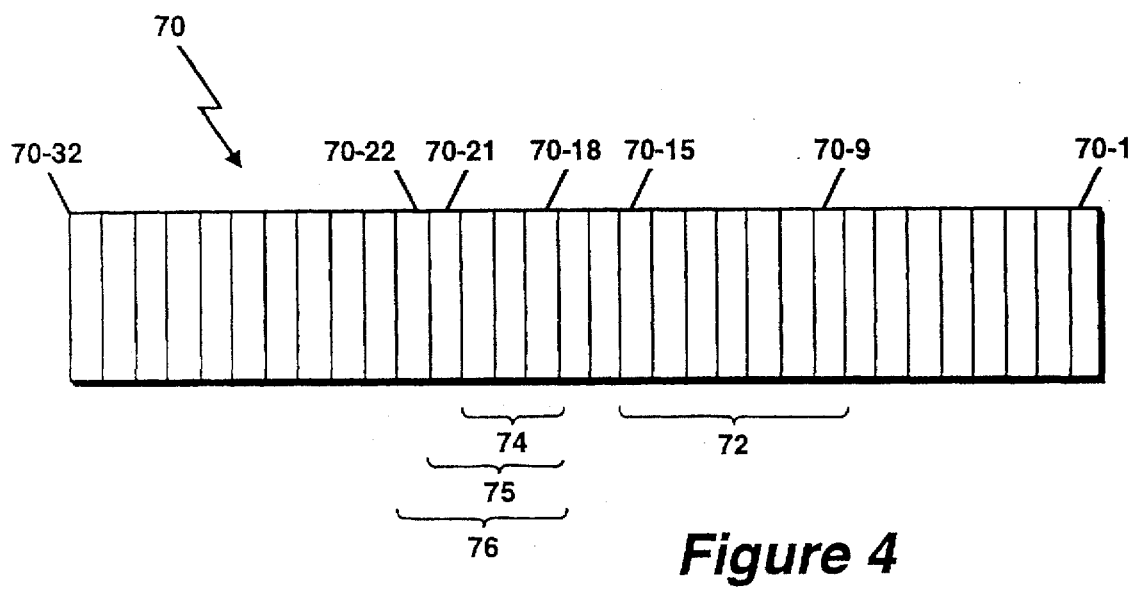
FIG. 4 shows a schematic diagram of a key address used to derive a cache memory address.

Each cache entry 62 stores a routing address data 64 for nodes within the various networks 13,15,17 retrieved from the address resolution engine 22. Each individual entry in the address resolution engine 22 (ie. representing each node within the system) is uniquely identified by, for example, the maximum size OSI 20-byte address. In order to avoid the necessity of performing a 20-byte comparison when searching for address data in the address resolution engine 22, this is compressed to a 32-bit hashed key using techniques well known in the art. Such a key 70 is shown in FIG. 4. The key 70 is used to determine the cache address 61,63 into which the routing address data will be placed. The key is 32 bits long, having a least significant bit 70-1, and a most significant bit 70-32, and is therefore capable of identifying $2^{32}$ (>$4\times10^9$) addressable locations. The cache 50, on the other hand, has $2^7$ multiplied by $2^4$ (=$2^{11}$ or 2048) addressable locations. A selection process maps the address of the entry in address resolution engine 22 to an address 61,63 in the cache (hereinafter referred to as the cache address) by using seven entry selection bits 72 of the key 70 to identify the entry address 63, and a further four page selection bits 75 to identify the page address 61. Thus bits 70-9 to 70-15 together with 70-18 to 70-21 fully identify the cache address 61,63. The particular bits 70-9 to 70-15 and 70-18 to 70-21 are entirely exemplary, and in reality would be carefully preselected for use by the selection process depending upon the distribution of individual key values 70 throughout the range of possible values arising in the 32-bit hashed address.

Cache address collisions can be accommodated using standard re-hashing techniques well known in the art. In the present example, a modified quadratic re-hashing scheme is used: if the cache address 61,63 is already occupied by a valid cache entry, then the next sequential address is tried, followed by the third next sequential address. To avoid significant processing overhead, only two re-hash operations are permitted, and if no vacant cache address 61,63 has been found thereafter, the data is not stored in the cache 50. Frequent occurrence of this situation suggests that the cache is too small, or that the selection process has not be optimised for the pattern of likely key values.

A cache usage monitoring system continually monitors the usage of the cache. This is preferably achieved by determining the ratio of valid cache entries to the number of available cache addresses, but might alternatively utilize factors such as the cache hit rate, the proportion of entries being aged out of the cache, or the number of collisions which must be handled during the cache address selection process. This permits the system to determine whether the present cache size is optimal and making efficient use the valuable high speed memory resource 36. Such cache size monitoring systems are well known in the art, and may form part of a cache refreshment system responsible for the ageing out of old or stale cache entries. A cache refreshment mechanism has been described in co-pending UK Patent Application entitled "Low overhead, non-coherent cache refreshment mechanism" filed by Digital Equipment International Limited on the same date as the present application.

In accordance with the present invention, where the cache usage monitoring system determines that the cache is being under-utilized, the cache is reduced in size by removing a number of pages from the cache. This is effected by a modification to the selection process which maps the 32-bit key address 70 to a cache address 61,63. In the simple example above, this may be achieved by reducing the number of pages from $2^4$ to $2^3$, and reducing the number of page selection bits 75 to only include bits 70-18 to 70-20 of key address 70, ie. by removal of most significant bit 70-21 from the page selection bits 75 to form page selection bits 74. It will thus be clear that all entries 62 in the cache 50 resident on pages 60-9 ($2^3+1$) to 60-16 ($2^4$) are no longer addressable using this new selection process and will effectively be lost. This, however, is transparent to the processor 34: the remaining entries 62 on pages 60-1 to 60-8 will remain accessible using the new selection process, and any requests for data therein will result in a cache hit. A request for data resident in the removed pages will result in the new selection process directing the processor 34 to a different page 60 within the new page address range 60-1 to 60-8, such that a cache miss will be reported in conformity with the normal operation of a non-coherent cache. The processor will then request the data from the ARE 22.

Conversely, where the cache usage monitoring system determines that the cache is being over-utilized, with consequent detrimental effects on the speed and performance of the system, the cache may be increased in size by adding a number of pages 60 to the cache. This is effected by a modification to the selection process which maps the 32-bit key address 70 to a cache address 61,63 in analogous manner to that described above for reducing the cache size. In this instance, however, the cache size is doubled to 32 ($2^5$) pages, and an extra page selection bit 70-22 is utilized in the selection process, to result in page selection bits 76 forming a new cache address 61,63.

For some entries 62 (about half the total number) previously populating page range 60-1 to 60-16, the processor 34 will be directed to newly created pages 60-17 to 60-32 where the entry will, of course, not be found, resulting in a cache miss. The data will therefore have to be retrieved from address resolution engine 22 in manner already described. The data thereby retrieved will be mapped into the newly created pages 60-17 to 60-32, transparently to the processor. The original entries on pages 60-1 to 60-16 corresponding to those newly mapped entries will, of course, still reside in the cache on the smaller sub-set of pages 60-1 to 60-16 before the cache expansion, but will no longer be accessible to the system. This, also, will be transparent to the processor: the entries will, as in the normal operation of a non-coherent cache, be either aged out by the cache management system, or victimized and overwritten for new cache entries according to the protocol being used.

Various selection processes or algorithms may be used, and the invention is not limited to the 32-bit key address bit-masking scheme illustrated above. The selection of bits 70-9 to 70-15 for establishing the entry address 63, and the selection of bits 70-18 to 70-21 for establishing the page address is exemplary only, as indicated above. In the example given where page numbering changes are effected by addition or deletion of a bit from the page selection bits 74, 75 or 76, access is retained after resizing to half of the former cache entries 62 in existence before resizing, with the condition that the cache size may only be altered by a factor of two, up or down.

Where a different selection process is used, for example, modulo division of a portion of the key address 70 by the number of entries 60 permitted in the cache 50, or division of the key address by the largest prime number below the number of pages of the cache, etc., then smaller changes in number of pages may be effected. This may have the effect of reducing the proportion of live cache entries which remain accessible after the resizing operation.

For example, supposing that the cache address is obtained by modulo division of the key address 70 (or part thereof) by the cache size. Assuming a potential 10000 addresses exist in ARE 22, and the cache size initially has a potential 2000 locations available for use, and ARE key address numbers "0128" and "5255" would therefore be mapped to cache addresses "0128" and "1255" respectively. A subsequent change in cache size by 10% to 1800 locations would cause the selection process to map those locations to "0128" and "1655" respectively. It will be observed that a 10% change in cache size will result in the lowest 10% of key addresses 70 ("0000" to "1800") maintaining their cache mapping locations after resizing, but all other key address 70 ("1801" to "9999") will be redistributed through the cache pages now available. The smaller the allowable change in cache size, the larger the loss of accessible cache entries after resizing and the lower the hit rate will fall temporarily after resizing. Thus, choice of selection process will depend upon the individual requirements.

Although the present invention has been described by reference to a system in which the cache is structured in pages, it will be recognised that the invention is equally applicable to addressing any area of contiguous memory space which may dynamically increase or decrease in size.

I claim:

1. A method for resizing a non-coherent cache wherein said cache memory space is sub-divided into a number of pages, each page containing a memory space for a predetermined number of entries, said method including the steps of:

a) setting a cache size of a first number of pages;

b) receiving data items each including a key value and storing said data in said cache at addresses on pages determined by a first selection process operating on said key value;

c) monitoring cache usage to determine whether said first number of cache pages should be increased or decreased;

d) in the event that said first number of cache pages should be increased or decreased, receiving further data items and storing said further data items at addresses on pages in the cache according to a second selection process different to said first selection process, said second selection process operating on said key value such that said key value maps to remaining cache pages in the event of a decrease in cache size and to added cache pages in the event of an increase in cache size.

2. A method according to claim 1 wherein both said first selection process and said second selection process map a proportion of said key values to the same cache entry addresses.

3. A method according to claim 1 or claim 2 wherein said key value comprises:
- a first portion comprising a first number of bits, used by said selection process to identify a page in said cache, and
- a second portion comprising a second number of bits, used by said selection process to identify an entry position in said page.

4. A method according to claim 1 or claim 2 wherein said key value comprises a first portion used by said selection process to identify a page starting address in said cache, and a second portion used by said selection process to identify an entry offset from said page starting address.

5. A method according to any previous claim including the step of monitoring the cache hit rate in order to determine whether said cache should be increased or decreased in size.

6. A method according to claim 3 wherein:
- if said monitoring step indicates that an increase of cache memory size is desirable, said second selection process is predetermined to use a larger number of bits of said key value to comprise said first portion than said first selection process; and
- if said monitoring step indicates that a decrease of cache memory size is desirable, said second selection process is predetermined to use a smaller number of bits of said key value to comprise said first portion than said first selection process.

7. Apparatus according to claim 6 wherein both said first selection process and said second selection process map a proportion of said key values to the same cache entry addresses.

8. A cache memory system including:
- a processor;
- a cache memory including a first number of pages;
- means for receiving data items each including a key value and storing said data items in said cache at addresses on pages determined by a first selection process operating on said key values;
- means for monitoring cache usage to determine whether said first number of cache pages should be increased or decreased;
- means for modifying said first selection process to a second selection process in response to said means for monitoring determining that said first number of cache pages should be increased or decreased, such that further received data items are stored at cache addresses on pages according to said second selection process, said second selection process mapping said key value to remaining cache pages in the event of a decrease in cache size and to added cache pages in the event of an increase in cache size.

* * * * *